United States Patent [19]

Wu

[11] Patent Number: 5,666,990
[45] Date of Patent: Sep. 16, 1997

[54] ATTACHMENT MEMBER FOR ENGAGING WITH DIFFERENT TIRE VALVES

[76] Inventor: Scott Wu, No. 2, Lane 296, Ming Sheng Road, Wu Feng Hsiang, Taichung Hsien, Taiwan

[21] Appl. No.: 553,854
[22] Filed: Nov. 6, 1995
[51] Int. Cl.[6] .................. F16K 11/044; F16K 31/528
[52] U.S. Cl. .................. 137/223; 137/625.5; 251/258; 251/352
[58] Field of Search .................. 137/223, 625.48, 137/625.5; 251/257, 258, 352

[56] References Cited

U.S. PATENT DOCUMENTS

| | | | |
|---|---|---|---|
| 1,789,306 | 1/1931 | Ewald | 137/223 |
| 1,838,166 | 12/1931 | Wahl | 137/223 |
| 1,860,888 | 5/1932 | Crowley | 137/223 |
| 1,918,689 | 7/1933 | Crowley | 137/223 |
| 2,441,253 | 5/1948 | Sarver | 251/258 |
| 2,534,577 | 12/1950 | Courtot | 251/258 X |
| 2,662,721 | 12/1953 | Giauque | 137/625.5 X |
| 2,847,028 | 8/1958 | Ross | 137/867 |
| 2,880,747 | 5/1959 | Newcomb | 137/223 |
| 3,369,564 | 2/1968 | Puccinelli et al. | 251/259 |
| 3,572,384 | 3/1971 | Taylor | 137/625.5 |
| 4,161,191 | 7/1979 | Ranger et al. | 251/352 |
| 5,441,080 | 8/1995 | Baumann | 251/258 X |

FOREIGN PATENT DOCUMENTS

| | | | |
|---|---|---|---|
| 532760 | 1/1941 | United Kingdom | 137/223 |
| 548165 | 9/1942 | United Kingdom | 137/223 |
| 548787 | 10/1942 | United Kingdom | 137/223 |

*Primary Examiner*—John Rivell
*Attorney, Agent, or Firm*—Charles E. Baxley, Esq.

[57] ABSTRACT

An attachment member for a hand pump includes two different valve openings for engaging with different tire valves. The attachment member includes a valve member slidably engaged in a tube. The valve member includes two head portions for engaging with two valve seats formed in the tube. A cam shaft is rotatably engaged in the tube and the valve member for moving the valve member laterally in the tube so as to engage either of the head portions with the valve seats, such that the attachment member may engage with different tire valves engaged in the caps.

1 Claim, 4 Drawing Sheets

5,666,990

ATTACHMENT MEMBER FOR ENGAGING WITH DIFFERENT TIRE VALVES

BACKGROUND OF THE INVENTION

1. Field of the Invention

The present invention relates to a hand pump, and more particularly to a hand pump having an attachment member for pumping different tire valves.

2. Description of the Prior Art

Typical hand pumps comprise a cylinder having a handle for pumping a piston which is slidably engaged in the cylinder. However, the hand pumps each includes an attachment member that is good for engaging with a specific type of tire valve and which is not suitable for engaging with different tire valves. In order to pump two different tire valves, it is required to prepare two hand pumps having different attachment members for engaging with the different tire valves.

The present invention has arisen to mitigate and/or obviate the afore-described disadvantages of the conventional hand pump attachment members.

SUMMARY OF THE INVENTION

The primary objective of the present invention is to provide a hand pump which includes an attachment member for engaging with different tire valves.

In accordance with one aspect of the invention, there is provided an attachment member for a hand pump for engaging with different tire valves, the attachment member comprises a tube including a bore formed therein, and including a middle portion having an aperture formed therein and intersecting with the bore, the tube including two end portions and including a first and a second valve seats formed therein, two caps secured to the end portions of the tube, the caps each including a mouth formed therein for engaging with the tire valves, a cam shaft rotatably engaged in the aperture of the tube and including a passageway formed therein, a pair of gaskets engaged in the end portions of the tube, and a valve member slidably engaged in the tube so as to form an annular chamber between the valve member and the tube, the valve member being engaged between the gaskets, the valve member including two ends having a first and a second head portion formed thereon respectively for engaging with the first and the second valve seats of the tube respectively, the valve member including a middle portion having an orifice formed therein for engaging with the cam shaft, the passageway of the cam shaft being communicating with the orifice, the ends of the valve member including a first and a second valve opening formed therein respectively and including a first and a second passage formed therein for communicating the first and the second valve openings with the annular chamber. The first head portion of the valve member is forced to engage with the first valve seat by the cam shaft when the cam shaft is rotated relative to the tube, so as to allow the second head portion to be disengaged from the second valve seat and so as to allow an air from the passageway to flow through the orifice and the annular chamber and the second valve seat and the second passage and to flow out of the mouth via the second valve opening, and the second head portion of the valve member is forced to engage with the second valve seat by the cam shaft when the cam shaft is further rotated relative to the tube, so as to allow the first head portion to be disengaged from the first valve seat and so as to allow the air from the passageway to flow through the orifice and the annular chamber and the first valve seat and the first passage and to flow out of the mouth via the first valve opening, such that the attachment member may be provided for engaging with different tire valves engaged in the caps respectively.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
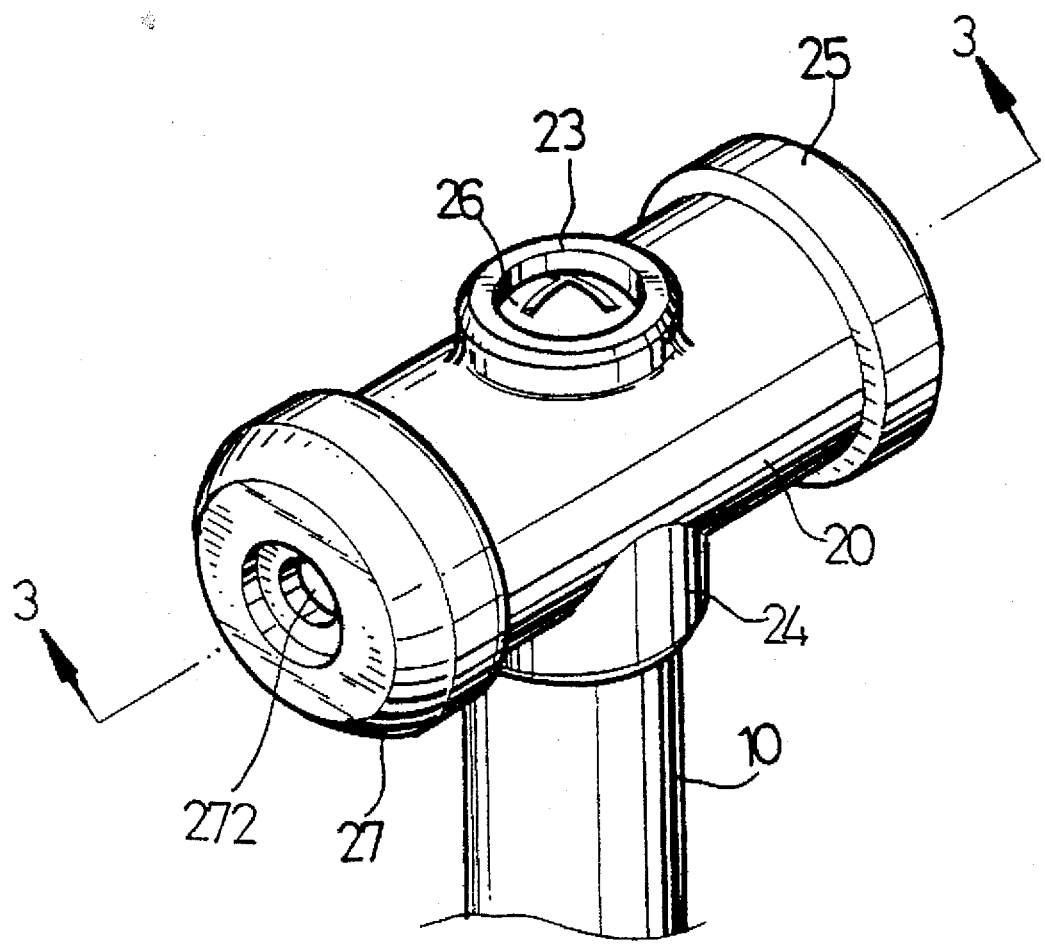
FIG. 1 is a perspective view of the attachment member for a hand pump in accordance with the present invention.
Figure 2:
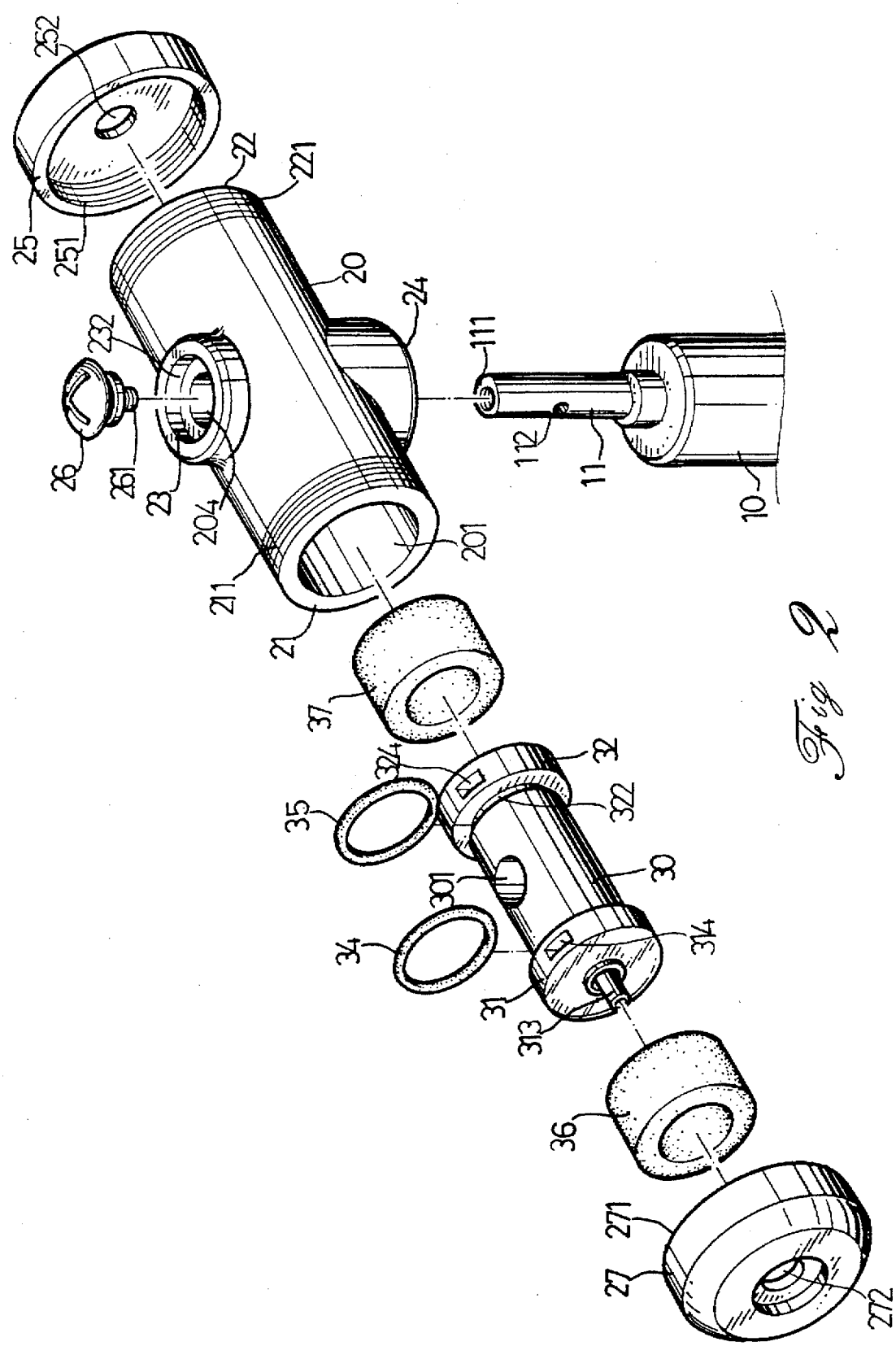
FIG. 2 is an exploded view of the attachment member.
Figure 3:
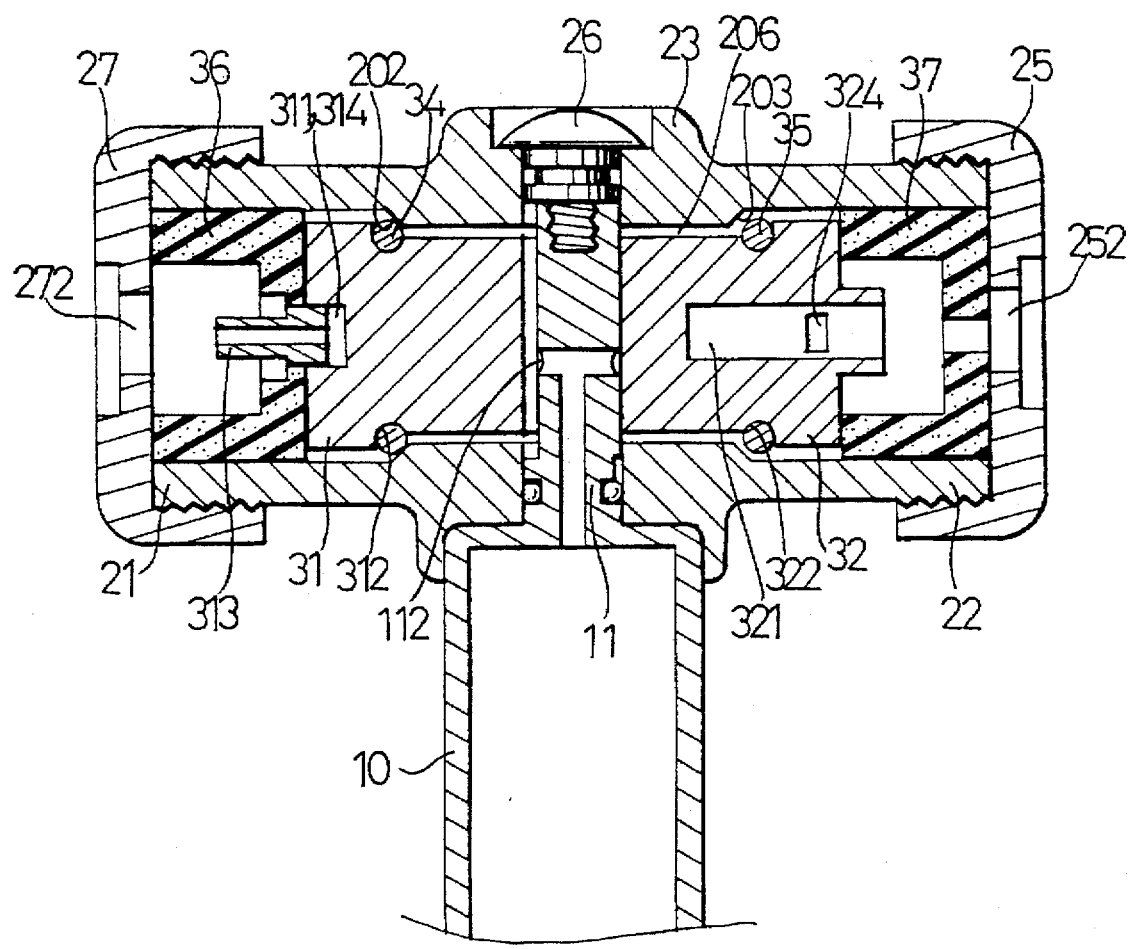
FIGS. 3 and 4 are cross sectional views taken along lines 3—3 of FIG. 1.

Referring to the drawings, and initially to FIGS. 1 to 3, an attachment member for a hand pump in accordance with the present invention comprises a pipe 10 including a cam shaft 11 extended upward therefrom and having a screw hole 111 formed therein and having an air passageway 112 formed therein and communicating with the pipe 10. The cam shaft 11 is arranged eccentrically relative to the pipe 10. The attachment member comprises a tube 20 including a stud 24 extended downward therefrom so as to form a T-shaped configuration. The upper portion of the pipe 10 is rotatably engaged in the stud 24. The tube 20 includes two ends 21, 22 each having an outer thread 211, 221 formed thereon for engaging with inner threads 251, 271 of two caps 25, 27 respectively such that the caps 25, 27 may be secured to the end portions of the tube 20. The caps 25, 27 each includes a mouth 252, 272 formed therein for engaging with tire valves. The tube 20 includes a bore 201 formed therein for slidably receiving a valve member 30 and two gaskets 36, 37 therein and includes two valve seats 202, 203 (FIGS. 3 and 4) formed therein. The tube 20 includes an aperture 204 vertically formed in the middle portion and extended in the stud 24 and intersecting with the bore 201 of the tube 20. The cam shaft 11 is rotatably engaged in the aperture 204. The tube 20 includes an annular wall 23 extended upward therefrom so as to form an annular shoulder 232 therein for engaging with a head portion 26 of a screw 261. The screw 261 is engaged with the screw hole 111 of the cam shaft 11 so as to secure the cam shaft 11 to the tube 20.

The valve member 30 includes two enlarged head portions 31, 32 formed in the end portions for engaging with the valve seats 202, 203 of the tube 20 and includes two annular grooves 312, 322 (FIGS. 3 and 4) formed beside the enlarged head portions 31, 32 for engaging with the sealing rings 34, 35 respectively. Either of the sealing rings 34, 35 may be forced to engage with the valve seats 202, 203 so as to block the air passages to the mouths 252, 272 of the caps 25, 27 when either of the enlarged head portions 31, 32 of the valve member is forced toward the respective valve seats 202, 203. The valve member 30 includes an orifice 301 aligned with the aperture 204 of the tube 20 for receiving the cam shaft 11, and arranged such that the valve member 30 may be forced to move longitudinally in the tube 20 when the cam shaft 11 is rotated relative to the tube 20. The head portions 31, 32 each includes a valve openings 311, 321 formed therein. A nozzle 313 is engaged in the valve opening 311 for engaging with Japanese or French type tire valves. The valve opening 321 is good for engaging with American type tire valves.

It is to be noted that the sizes of the head portions 31, 32 is slightly smaller than the inner size of the bore 201 of the tube 20 such that air may flow through the head portions 31, 32 when the sealing rings 34, 35 are not engaged with the respective valve seats 202, 203. The head portions 31, 32 each includes a passage 314, 324 formed therein for communicating the valve openings 311, 321 with the annular chamber 206 (FIGS. 3 and 4) which is formed between the outer peripheral portion of the valve member 30 and the tube 20.

In operation, as shown in FIG. 3, the sealing ring 35 is forced to engage with the valve seat 203 by the cam shaft 11 when the cam shaft 11 is rotated by the pipe 10. At this moment, the valve seat 202 is opened such that the air from the passageway 112 of the cam shaft 11 is allowed to flow through the orifice 301 and the annular chamber 206 and the valve seat 202 and the passage 314 and to flow out of the mouth 272 via the valve opening 311 and the nozzle 313, such that the hand pump may be provided for pumping a tire valve engaged in the cap 27.

Figure 4:
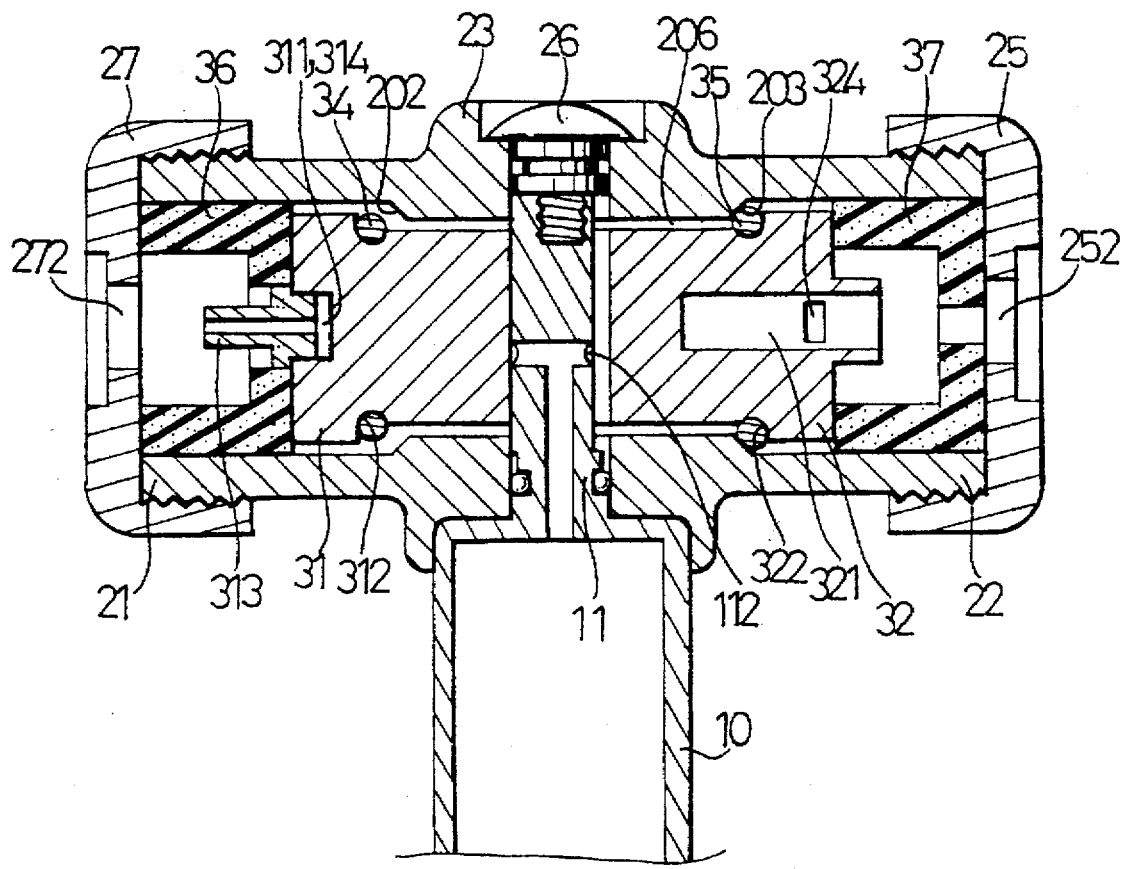

However, as shown in FIG. 4, the sealing ring 34 is forced to engage with the valve seat 202 when the cam shaft 11 is further rotated relative to the tube 20 by the pipe 10. At this moment, the valve seat 203 is opened such that the air from the passageway 112 of the cam shaft 11 is allowed to flow through the orifice 301 and the annular chamber 206 and the valve seat 203 and the passage 324 and to flow out of the mouth 252 via the valve opening 321, such that the hand pump may be provided for pumping a tire valve engaged in the cap 25.

Accordingly, the attachment member of the hand pump in accordance with the present invention may be provided for engaging with different tire valves.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An attachment member for a hand pump for engaging with different tire valves, said attachment member comprising:

a tube including a bore formed therein, and including a middle portion having an aperture formed therein and intersecting with said bore, said tube including two end portions and including a first and a second valve seats formed therein, two caps secured to said end portions of said tube, said caps each including an mouth formed therein for engaging with the tire valves, a cam shaft rotatably engaged in said aperture of said tube and including a passageway formed therein, a pair of gaskets engaged in said end portions of said tube, and a valve member slidably engaged in said tube so as to form an annular chamber between said valve member and said tube, said valve member being engaged between said gaskets, said valve member including two ends having a first and a second head portion formed thereon respectively for engaging with said first and said second valve seats of said tube respectively, said valve member including a middle portion having an orifice formed therein for engaging with said cam shaft, said passageway of said cam shaft being communicating with said orifice, said ends of said valve member including a first and a second valve opening formed therein respectively and including a first and a second passage formed therein for communicating said first and said second valve openings with said annular chamber, said first head portion of said valve member being forced to engage with said first valve seat by said cam shaft when said cam shaft is rotated relative to said tube, so as to allow said second head portion to be disengaged from said second valve seat and so as to allow an air from said passageway to flow through said orifice and said annular chamber and said second valve seat and said second passage and to flow out of said mouth via said second valve opening, and said second head portion of said valve member being forced to engage with said second valve seat by said cam shaft when said cam shaft is further rotated relative to said tube, so as to allow said first head portion to be disengaged from said first valve seat and so as to allow the air from said passageway to flow through said orifice and said annular chamber and said first valve seat and said first passage and to flow out of said mouth via said first valve opening.

* * * * *